United States Patent [19]

van der Lely et al.

[11] 4,173,260
[45] Nov. 6, 1979

[54] SOIL CULTIVATING IMPLEMENTS

[75] Inventors: Ary van der Lely, Maasland; Cornelis J. G. Bom, Rozenburg, both of Netherlands

[73] Assignee: Cornelis van der Lely N.V., Maasland, Netherlands

[21] Appl. No.: 825,583

[22] Filed: Aug. 18, 1977

[30] Foreign Application Priority Data

Aug. 23, 1976 [NL] Netherlands ................ 7609321

[51] Int. Cl.² ........................................... A01B 33/06
[52] U.S. Cl. ...................................... 172/59; 172/311; 172/424; 172/674
[58] Field of Search ................. 172/59, 117, 311, 456, 172/466, 413, 424; 298/17 B

[56] References Cited

U.S. PATENT DOCUMENTS

| | | | |
|---|---|---|---|
| 161,830 | 4/1875 | Sights | 172/456 |
| 2,593,176 | 4/1952 | Patterson | 172/466 |
| 2,704,021 | 3/1955 | Brundage | 172/466 X |
| 3,104,723 | 9/1963 | Skalka | 172/424 X |
| 3,135,339 | 6/1964 | Fry | 172/413 |
| 3,667,551 | 6/1972 | Lely | 172/59 |
| 3,779,320 | 12/1973 | Cantone | 172/60 |
| 3,981,366 | 9/1976 | Lely | 172/59 |
| 4,074,765 | 2/1978 | Lely | 172/59 |

*Primary Examiner*—Richard J. Johnson
*Attorney, Agent, or Firm*—William B. Mason; Penrose Lucas Albright

[57] ABSTRACT

An agricultural implement has a main frame and laterally positioned carrier frames pivoted to the sides of the main frame. The main frame extends forward to a coupling point for connection to a prime mover. The rear of the main frame mounts a hydraulic piston assembly that is interconnected to each carrier frame to elevate same into an upward tilted transport position. Each frame and carrier frame supports a frame portion having a respective group of rotatable soil working members positioned in a row to work a broad path during working operation. Connecting members on the carrier frames are connected to the central frame portion to raise same when the carrier frames are in their tilted transport positions. Latches supported on the main frame secure beams of the carrier frames in their tilted positions until release. A pair of ground wheels on a mount is pivoted to the main frame and hydraulic connections pivot the wheels to a raised non-transport position or urge the wheels down to support the main frame whereupon latches lock the wheels in the transport position. Springs partly support the carrier frames during operation and further springs urge the wheels downwardly when the latches are disengaged. Each group of soil working members on its frame portion has a parallelogram linkage connection to the remainder of the respective main or carrier frames to permit relative displacements of the groups.

8 Claims, 8 Drawing Figures

SOIL CULTIVATING IMPLEMENTS

According to one aspect of the invention, there is provided a soil cultivating implement of the kind set forth, wherein means is provided by which one of said two groups can be tilted upwardly relative to the other group, a connecting member being provided which, when said one group is tilted upwardly, causes said other group to be raised in level relative to the main frame.

For a better understanding of the invention, and to show how the same may be carried into effect, reference will now be made, by way of example, to the accompanying drawings, in which.

Figure 2:
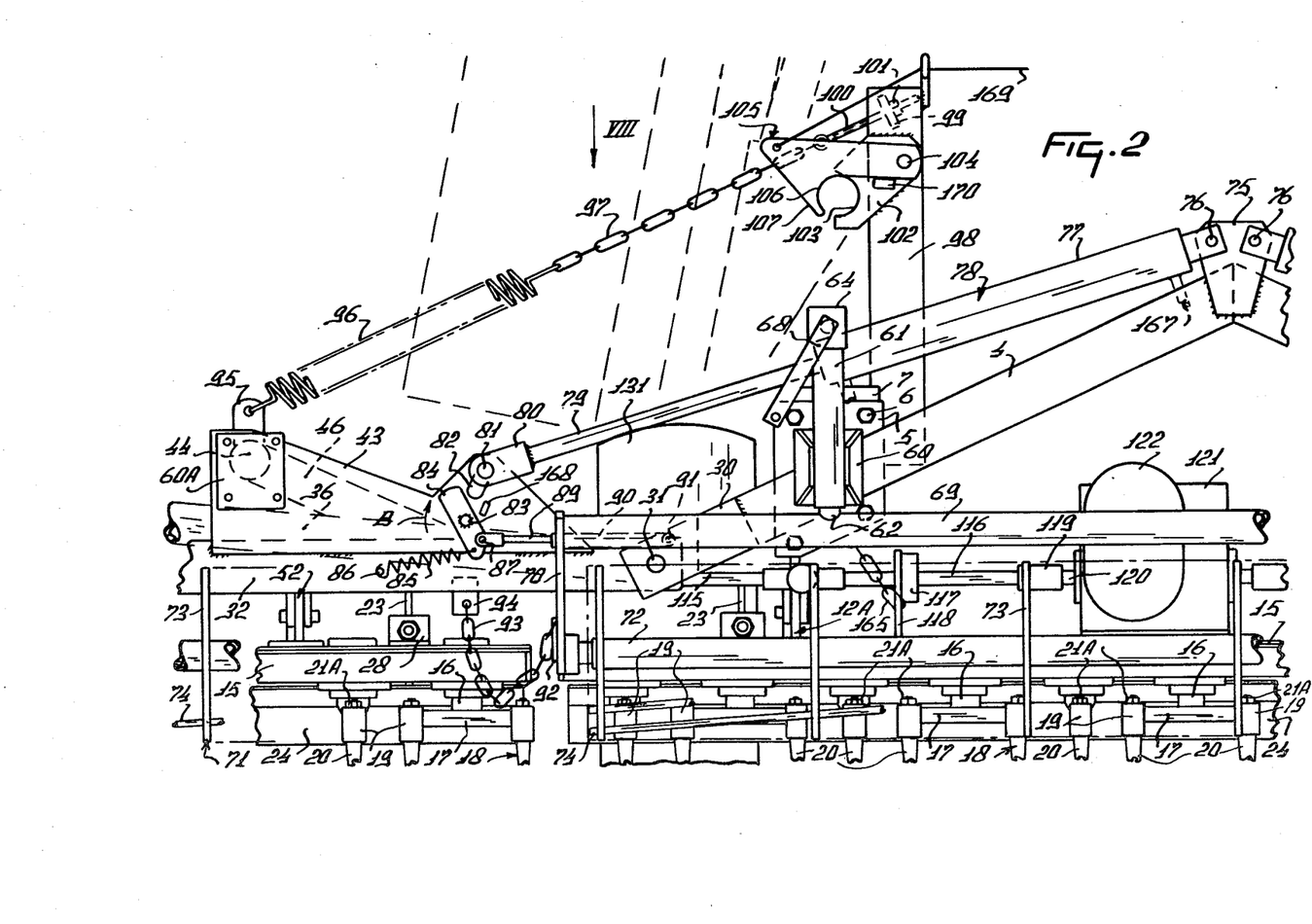
FIG. 2 is a rear elevation, to an enlarged scale, of parts of the implement of FIG. 1 as seen in the direction indicated by an arrow II in that Figure.
Figure 3:
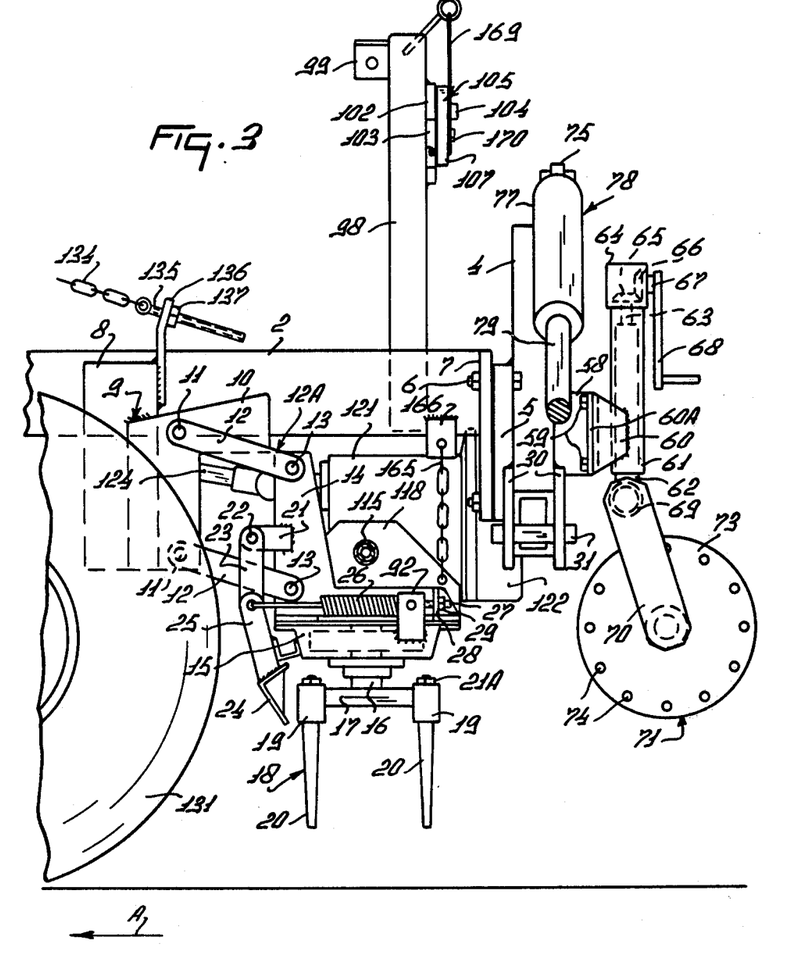
FIG. 3 is a section, to an enlarged scale, taken on the line III—III in FIG. 1.

Referring to the accompanying drawings, the soil cultivating implement or machine that is illustrated therein has a main frame 1 which includes two symmetrically indentical beams 2 that extend substantially horizontally parallel to one another and to the intended direction of straight forward operative travel of the machine that is indicated by an arrow A in several of the Figures of the drawings, the parallel beams 2 being spaced apart from one another in a direction that is substantially perpendicular to the direction A. The leading ends of the beams 2 are secured to the rearmost ends of corresponding beams 3, said beams 3 being forwardly convergent from the beams 2 with respect to the direction A and actually being inclined downwardly at a few degrees to the horizontal from the beams 2 towards the junction between their leading ends. The rearmost ends of the two frame beams 2 with respect to the direction A are interconnected by a tie beam 4 that is of inverted shallow V-shaped configuration (see FIG. 2), the two limbs of the tie beam 4 being rigidly secured to one another at the uppermost "point" of the inverted V-shaped configuration. The locations of the connections of the rearmost ends of the beams 2 to the tie beam 4 are such that the two limbs of that tie beam project downwardly and laterally beyond the ends of the beams 2. The beams 2 are connected to the tie beam 4 by welding plates 5 to the leading surfaces of the limbs of the beams 4 and welding plates 7 to the rearmost ends of the two beams 2, the abutting pairs of plates 5 and 7 being rigidly but releasably secured to one another by corresponding groups of four substantially horizontally disposed bolts 6 (FIGS. 2 and 3). Each of the two frame beams 2 is provided, at a location spaced forwardly in the direction A from the corresponding plate 7, with a support 8 (FIGS. 1 and 3) that projects substantially vertically downwardly from the beam 2 concerned towards the ground surface at the side of that beam 2 which is remote from the centre of the implement and from the other beam 2. Each support 8 has a corresponding substantially vertically disposed plate 9 welded to its outer surface so that said plates 9 are in parallel relationship with the two frame beams 2, each plate 9 having an upper portion 10 that projects rearwardly by some distance beyond the remaining lower part of that plate. Upper and lower regions of each plate 9, that do not form parts of the respective upper portions 10, carry corresponding substantially horizontal pivot pins 11 which define axes that are substantially perpendicular to the direction A. Upper and lower pairs of arms 12 are turnable upwardly and downwardly about the respective pivot pins 11 at opposite sides of the respective plates 9, the rearmost ends of said arms 12 that are remote from the pivot pins 11 being turnably connected by further upper and lower pivot pins 13, that are parallel to the pivot pins 11, to corresponding upright supports 14, the two arms 12 of each pair being located at opposite sides of the support 14 concerned. The two upright supports 14 are secured to the top of a hollow box-section frame portion 15 and it will be apparent that the pairs of arms 12, the pivot pins 11 and 13 and the upright supports 14 form parts of a dual parallelogram linkage 12A which is so constructed and arranged that the hollow frame portion 15 can move upwardly and downwardly, without signigicant tilting, relative to the main frame 1.

Figure 1:
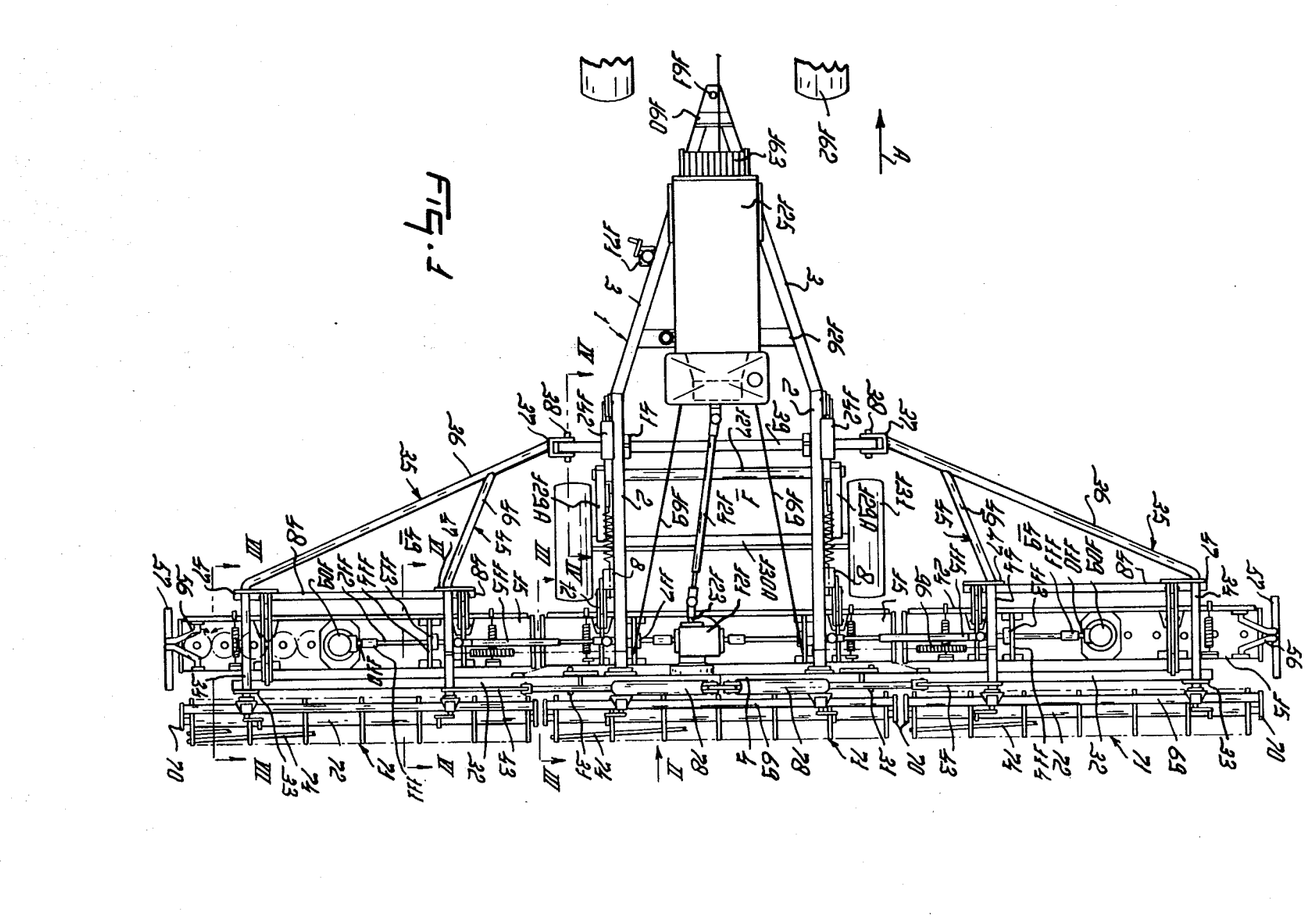
FIG. 1 is a plan view of a soil cultivating implement in accordance with the invention at the rear of an agricultural tractor.

As seen in the plan view of FIG. 1 of the drawings, the hollow frame portion 15 extends substantially horizontally perpendicular to the direction A in parallel or substantially parallel relationship with the tie beam 4, said frame portion 15 rotatably supporting a plurality (in this case twelve) of substantially vertical, or at least upwardly extending, shafts 16. The longitudinal axes of the shafts 16 are spaced apart from one another at regular intervals which preferably, but not essentially, have magnitudes of substantially 25 centimeters, each shaft 16 projecting downwardly from beneath the bottom of the frame portion 15 where it is splined or otherwise keyed to receive a hub at the center of a substantially horizontally disposed tine support or carrier 17 of a corresponding rotary soil working member 18. The opposite ends of each support or carrier 17 are provided with substantially cylindrical sleeve-like tine holders 19 in which upper fastening portions of rigid soil working tines 20 are firmly but releasably secured by nuts 21A that co-operate with short uppermost screwthreaded parts of the tine fastening portions. The tine 20 have lower soil working portions that project downwardly into the ground from the holders 19 when the implement is in use, said soil working portions being inclined downwardly and rearwardly with respect to the intended directions of operative rotation of the corresponding soil working members 18 so as to trail rearwardly relative to those directions from top to bottom.

Each of the supports 14 is provided, at its front with respect to the direction A, with a forwardly projecting lug 21 that is located substantially midway between the top and bottom of the support 14 concerned. The leading end of each lug 21 has the upper end of a corresponding downwardly projecting arm 23 pivotally connected to it by a substantially horizontal pin 22 that is in parallel relationship with the pivot pins 11 and 13. Each arm 23 initially projects substantially vertically downwards from the corresponding pivot pin 22 but is then bent over rearwardly with respect to the direction A to form a portion that is inclined at a few degrees to the vertical. The lowermost ends of the inclined portions of the two arms 23 are secured to the top of a beam 24 which, as can be seen in FIG. 3 of the drawings, is of L-shaped cross-section. It will be seen from the drawings that the beam 24 is located at the same horizontal level as are the supports or carriers 17, the holders 19 and the fastening portions of the tines 20 of the soil working members 18 and is disposed immediately in front of those members 18 with respect to the direction A throughout the combined width of the twelve (in this embodiment members 18 that are carried by the hollow frame portion 15. The beam 24 affords a screen that is arranged to protect the upper parts of the soil working members 18 that have just been mentioned from being damaged by stones and other hard objects that may be met with in the soil as the implement makes operative progress in the direction A when it is in use. Two brackets 25 are secured to the top of the screening beam 24 so as to project upwardly therefrom at locations towards the opposite ends of the beam 24, one of said brackets 25 being in concealing register with the lower downwardly and rearwardly inclined portion of one of the arms 23 as seen in FIG. 3 of the drawings. The upper ends of the brackets 25 are formed with holes through which are entered hooking ends of corresponding strong tension springs 26. The tension springs 26 extends substantially horizontally parallel to the direction A on top of the hollow frame portion 15 and their rearmost ends are secured to screwthreaded rods 27 that are entered through holes in upright limbs of corresponding brackets 28 which are fastened to the top of the frame portion 15 near the back thereof with respect to the direction A. The end of each screwthreaded rod 27 that is disposed rearwardly of the corresponding bracket 28 with respect to the direction A carries a nut 29 and it will be apparent that the initial tension of each spring 26 can be increased, or decreased, as may be desired by moving the corresponding nut 29 along the respective rod 27 to an appropriate position. The springs 26 tend to turn the arms 23 and the beam 24 in an anticlockwise direction about the axis defined by the pivot pins 22 as seen in FIG. 3 of the drawings but stops carried at the front of the hollow frame portion 15 co-operate with the arms 23 and prevent the beam 24 from actually contacting the soil working members 18. If a large stone or the like should become momentarily jammed between one or more of the soil working members 18 and the screening beam 24, that beam can yield forwardly about the axis defined by the pivot pins 22, against the action of the springs 26, to allow the stone or the like to be released without causing a breakage or any significant damage.

The opposite ends of the tie beam 4 have pairs of lugs 30 welded to them so as effectively to form forks, the two lugs 30 of each pair being perpendicularly interconnected by a corresponding stub shaft 31 which defines an axis that is substantially horizontally parallel to the direction A. Each stub shaft 31 has one end of a corresponding frame beam 32 turnably mounted thereon between the respective lugs 30. When the implement is in operation, the two frame beams 32 extend substantially horizontally perpendicular to the direction A and, as seen in the plan view of FIG. 1, in line with the intervening tie beam 4. Each frame beam 32 is provided, close to the free end thereof that is remote from the respective stub shaft 31, with an upwardly projecting plate 33 through which is entered a portion 34 of a corresponding frame beam 35, said portion 34 being in substantially horizontally parallel relationship with the direction A. The leading end of each beam portion 34 with respect to the direction A is bent over sharply to form a further straight portion 36 which is, however, inclined downwardly at a few degrees to the horizontal from its rearmost to its leading end. The leading end of each straight portion 36 is secured to the base of a corresponding fork 37 whose limbs are inclined upwardly and are contained in corresponding substantially vertical planes that are substantially perpendicular to the direction A. Horizontal pivot pins 38 (FIGS. 1 and 4) whose axes extend substantially parallel to the direction A, in coincident relationship with the axes defined by respective ones of the two stub shafts 31, couple the forks 37 to the opposite ends of a frame beam 39 which forms a part of the main frame 1. The beam 39 is located towards the leading ends of the two frame beams 2 with respect to the direction A and is rigidly but releasably secured thereto by the abutment of lower fastening plates 40 carried by the beam 39 and upper fastening plates 41 that are secured to the bottoms of the respective beams 2, the abutting lower and upper plates 40 and 41 being releasably interconnected by vertically disposed bolts 42. It will be apparent from FIG. 4 of the drawings that the opposite end portions of the beam 39 which carry the pivot pins 38 are inclined outwardly and downwardly away from the respective beams 2. Each of the two frame beams 32 has a corresponding upright plate 43 of the somewhat irregular shape that can be seen in FIG. 2 of the drawings secured to it at a short distance therealong from the respective stub shaft 31. The upper edge of each plate 43 is so shaped as to define two separate upward projections that are, accordingly, spaced by different distances from the stub shaft 31 concerned. The projection that is furthest from the corresponding stub shaft 31 has a portion 44 of a corresponding frame beam 45 passed through it and welded thereto (see FIG. 6). Each beam portion 44 extends substantially horizontally parallel to the direction A, its leading end being integrally connected by a sharp bend to a further straight portion 46 whose opposite leading end is rigidly secured to the portion 36 of the corresponding beam 35 at a distance from the fork 37 concerned (see FIG. 1). The portion 46 of each beam 45 is inclined downwardly at a few degrees to the horizontal from its integral junction with the portion 44 of the same beam to the location at which it is secured to the portion 36 of the corresponding frame beam 35. It will be seen from FIGS. 6 and 7 of the drawings that, substantially at the points at which the beams 35 and 45 are formed with sharp bends, said beams are entered through holes in substantially vertical plates 47 whose planes are substantially perpendicular to the direction A. Lower portions of each pair of plates 47 are welded to corresponding substantially horizotnal frame beams 48 that both extend substantially perpendicular to the direction A in parallel relationship with the respective frame beams 32. The beams 48 are located beneath the beams 35 and 45 and each group of beams 32, 35, 45 and 48 constitutes a corresponding carrier frame 49 which is pivotally connected to one side of the main frame 1 by the stub shaft 31 and pivot pin 38 that lie at the same side of said main frame 1.

Each plate 47 has a corresponding support plate 49A (see FIGS. 6 to 8 of the drawings) welded thereto at that side of the neighbouring beam 35 or 45 which is closest to the main frame 1, the support plates 49A being in substantially parallel relationship with the direction A. The support plates 49A form parts of corresponding dual parallelogram linkages 52 that are both similar to the dual parallelogram linkage 12A that has been described above. Each of the two dual parallelogram linkages 52 comprises upper and lower pivot pins 50 carried by the support plates 49A, upper and lower pairs of arms 51 and upper and lower pivot pins 53 carried by upright supports 54 that, like the upright supports 14, are mounted on top of corresponding hollow box-section frame portions which, once again, are both indicated by the reference 15. The two hollow frame portions 15 that are connected to the two carrier frames 49 are indentical in construction and function to the previously described frame portion 15 that is carried by the main frame 1 and, when the implement is in operation on level ground, the three hollow frame portions 15 lie alongside one another in end-to-end relationship (see FIG. 1). Each of the two "lateral" frame portions 15 carries a plurality (in this case, twelve) of the rotary soil working members 18 and is provided with a resiliently yieldable screening beam 24 for those members 18. It will, however, be noted that the outermost upright supports 54 that are carried at the tops of the two "lateral" frame portions 15 extend slidably upwardly between pairs of strips 55 that interconnect the frame beams 48 and brackets mounted on top of the frame beams 32. The strips 55 limit the upward and downward pivotability of the two dual parallelogram linkages 52 and prevent significant lateral displacements of the frame portions 15 concerned, and the parts which they carry, relative to the carrier frames 49. Shield plates 57 are arranged immediately beyond the outer ends of the two "lateral" frame portions 15 and each shield plate 57 is substantially vertically disposed in substantially parallel relationship with the direction A. Each shield plate 57 is connected by a pair of arms 56 to pivotal mountings on the top of the respective hollow frame portion 15, said pivotal mountings defining axes that are substantially horizontally parallel to the direction A. The lower edges of the shield plates 57 are shaped to slide over the ground surface during the operation, or maneuvering, of the implement and, due to its pivotal connection to the respective frame portion 15 by way of the corresponding arms 56, each shield plate 57 can turn upwardly and downwardly as may be required to match undulations in the surface of the ground over which the implement travels. The shield plates co-operate with the immediately neighbouring soil working members 18 in cultivating the soil and tend to minimise ridging at the margins of the broad strip of land that is worked by the implement. The shield plates 57 also tend to prevent stones and other potentially injurious articles from being flung laterally of the path of travel of the implement by the rapidly rotating tines 20 of the soil working members 18 that are close to said plates 57.

Supports 58 (FIG. 3) project rearwardly from the two limbs of the tie beam 4 at locations which substantially register with the points of connection of the rear ends of the frame beams 2 to said tie beam 4. Each support 58 has a base plate 60A of a corresponding frusto-conical bracket 60 firmly but releasably secured to it by bolts 59. The rearmost truncated end of each bracket 60 is welded to a corresponding vertically or substantially vertically disposed sleeve 61 inside which a second sleeve 62 is telescopically mounted, the lower end of each second sleeve 62 projecting downwardly from beneath the lower end of the sleeve 61 concerned. The second sleeves 62 are slidable upwardly and donwnwardly inside the sleeves 61 and each of them is formed with an internal screwthread into which, from the upper end, is entered a matching externally screwthreaded shaft 63. The uppermost end of each screwthreaded shaft 63 is mounted rotatably but substatially axially immovably in a housing 64 carried at the upper end of the outer sleeve 61 concerned, each shaft 63 being provided, inside the corresponding housing 64, with a bevel pinion 65. Each bevel pinion 65 has its teeth in driven mesh with a second bevel pinion 66 that is located inside the respective housing 64 at the inner end of a short substantially horizontal shaft 67 whose outer end projects rearwardly from the housing 64 concerned where it is provided with a manually operable crank handle 68. The lowermost ends of the second sleeves 62 that project from beneath the bottoms of the first sleeves 61 are both secured to a substantially horizontal carrier 69 that extends throughout the width of the central hollow frame portion 15 in parallel relationship therewith and thus perpendicular or substantially perpendicular relationship with the direction A. the opposite ends of the carrier 69 have corresponding support plates 70 rigidly secured to them in such a way that each strip-shaped support plate 70 is inclined downwardly and rearwardly with respect to the direction A from the carrier 69 at a few degrees to the vertical (see FIG. 3). The lowermost ends of the two support plates 70 carry substantially horizontally aligned bearings between which a supporting member in the form of an open ground roller 71 is mounted in a freely rotatable manner. The roller 71 has a central axially disposed tubular support 72 whose opposite ends are provided with stub shafts that co-operate with the bearings carried by the support plates 70, said support 72 being furnished, at regular intervals along its length, with a plurality, such as seven, of circular support plates 73 that are substantially vertically parallel to one another and substantially parallel to the direction A. Each support plate 73 is formed around its periphery with a plurality, such as twelve, of regularly spaced apart holes through which elongate elements 74 of solid rod-like or tubular formation are entered with each element 74 wound helically so some extent around the longitudinal axis of the roller 71 (see FIGS. 1 and 2). The elements 74 are preferably arranged in the peripheral holes in the support plate 73 in such a way as to be movable turnably in those holes to some extent.

Figure 6:
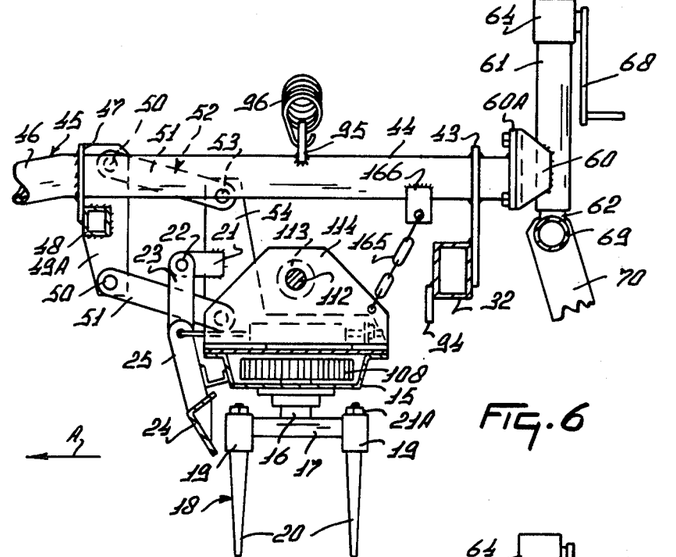
FIG. 6 is a section, to an enlarged scale, taken on the line VI—VI in FIG. 1.
Figure 7:
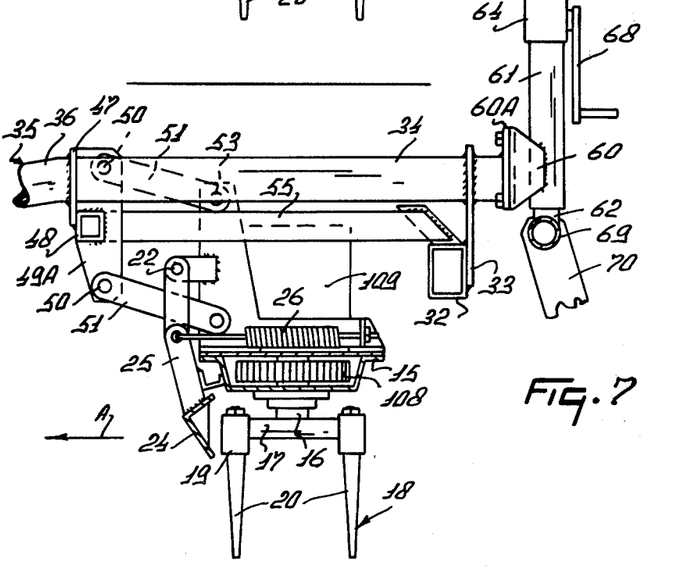
FIG. 7 is a section, to an enlarged scale, taken on the line VII—VII in FIG. 1.

The rearmost ends of all four of the frame beams 35 and 45 of the two carrier frames 49 are each provided with one of the base plates 60A and, as shown in FIGS. 6 and 7 of the drawings, each base plate 60A has directly and indirectly connected to it a number of parts that are indentical to the parts that have been described above as directly and indirectly connected to the base plates 60A which are secured to the tie beam 4 by the supports 58 and the bolts 59. Thus, there is a total of three supporting members that are afforded by corresponding ground rollers 71, the three rollers 71 being located to the rear of the main frame 1 and to the rears of the respective carrier frames 49.

Figures 4, 5:
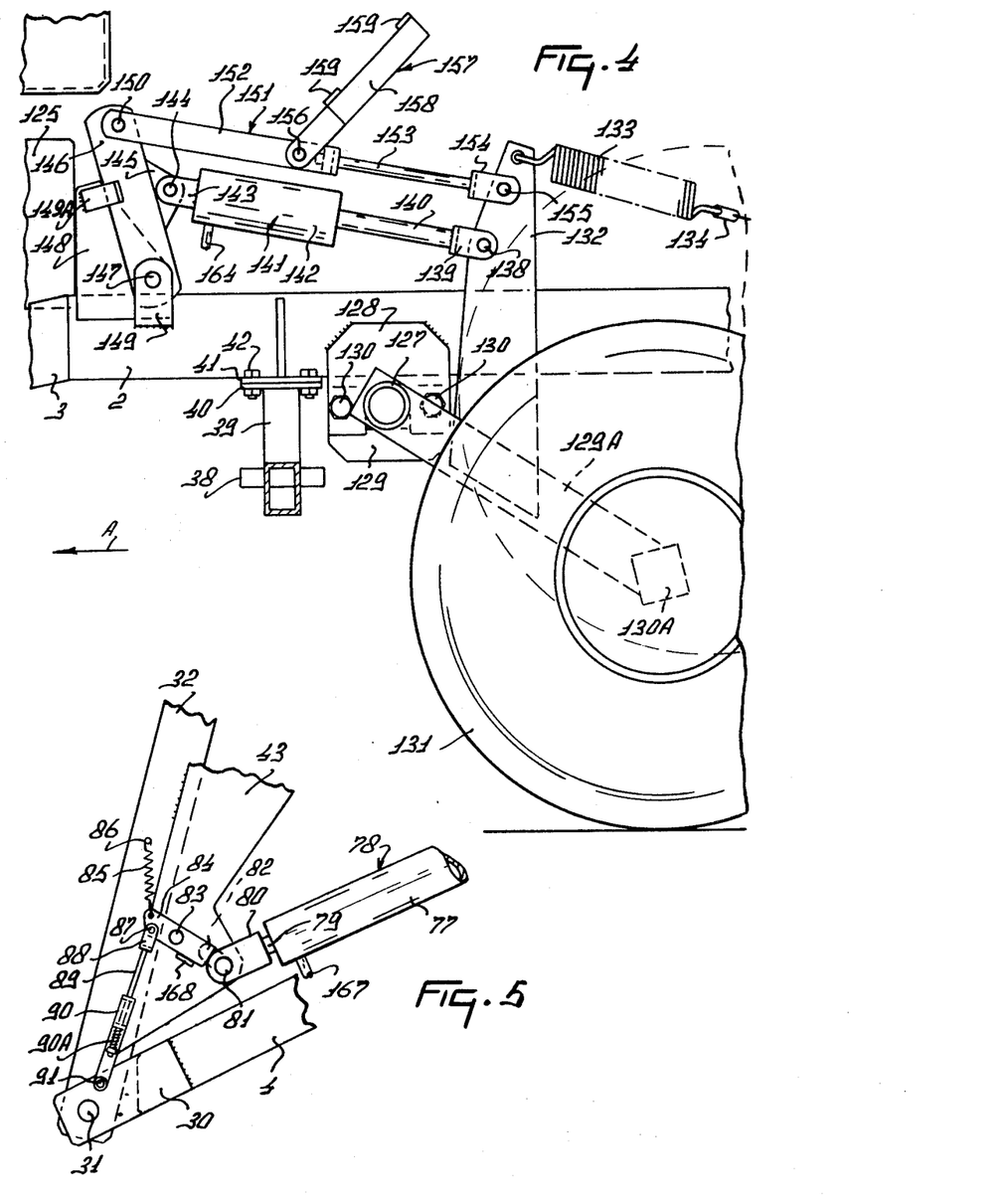
FIG. 4 is a section, to an enlarged scale, taken on the line IV—IV in FIG. 1.
FIG. 5 is a scrap rear elevation, to an enlarged scale, illustrating a pivotal connection between parts of the implement in greater detail.

A plate 75 (FIG. 2) of substantially trapezoidal configuration is welded to the uppermost point of the shallow V-shaped tie beam 4 in such a way that said plate 75 projects upwardly above the tie beam 4 with its greatest width (in a direction perpendicular to the direction A)

above the uppermost point of the tie beam 4. Two substantially horizontal pivot pins 76 that define corresponding axes which are both substantially parallel to the direction A connect forks carried at the base ends of the cylinders 77 of corresponding double-acting hydraulic piston and cylinder assemblies 78 to said plate 75. The two assemblies 78 extend in substantially opposite directions away from the plate 75 towards the two carrier frames 49 and each assembly 78 has a piston rod 79 provided with a fork 80 at its free outermost ends. Each fork 80 has its limbs interconnected by a horizontal pivot pin 81 and that pivot pin is entered through a slot 82 formed in the upright projection of the corresponding upright plate 43 that is closest to the main frame 1 of the implement. It will be noted from FIG. 2 of the drawings that the length of each slot 82 is inclined to the vertical by a few degrees in such a way that the uppermost end thereof is closer to the main frame 1 of the implement than is the lowermost end thereof when, of course, the implement is disposed in a position similar to the one which is illustrated in full lines in FIG. 2 of the drawings. A stop lever 84 is turnably mounted on a horizontal pivot 83 immediately beneath each slot 82, the upper end of each stop lever 84 (as seen in FIG. 2) being of convex curved configuration while the opposite lower end thereof is shaped to define a rounded tip. A tension spring 85 is stretched between a hole close to the lowermost rounded tip of each stop lever 84 and an ancorage pin 86 on the neighbouring frame beam 32 so that the stop lever 84 that is shown in FIG. 2 of the drawings tends to be turned about its pivot 83 in the direction indicated by an arrow B in the same Figure, the stop lever 84 that is mounted on the upright plate 43 of the other carrier frame 49 that is not illustrated in FIG. 2 being arranged in a symmetrically indentical manner. A pivot pin 87 (FIGS. 2 and 5) connects the limbs of a fork 88 to each stop lever 84 at a point which, as seen in FIG. 2 of the drawings, is just above the point of connection of one end of the corresponding tension spring 85 to that stop lever. The base of each fork 88 is fastened to a rod 89, said rod extending from the fork 88 through holes in two spaced transverse connections of a corresponding narrow fork 90 (FIG. 5). Each fork 90 is turnable about a pivot pin 91 that is carried by one of the lugs 30 at the free end of the neighbouring limb of the tie beam 4, the rod 89 being surrounded by a helical compression spring 90A between a stop on the rod at the end thereof that is nearest to the pivot pin 91 concerned and that transverse connection of the narrow fork 90 which is nearest to said pivot pin 91.

When the implement occupies a working position similar to the position thereof that is shown in FIG. 2 of the drawings, each pivot pin 91 is located above, although not exactly vertically above, the corresponding stub shaft 31 between the neighbouring end of the tie beam 4 and the frame beam 32 of the associated carrier frame 49, each pivot pin 91 actually being a little closer to the main frame 1 of the implement than is the neighbouring stub shaft 31. The function of the two stop levers 84 will be described in detail below, it being noted that the axes, defined by the pivots 83, about which the stop levers 84 are turnable are parallel or substantially parallel to the axes defined by the stub shafts 31.

Each end of the central hollow frame portion 15 is closed by a corresponding side plate and each of those side plates carries a lug 92 (FIGS. 2 and 8) to which one end of a corresponding flexible but inextensible connecting member in the form of a chain 93 is secured. The opposite ends of the chains 93 are connected to lugs 94 that depend from the frame beams 32 of the respective carrier frames 49. The rear straight portion 44 of each frame beam 45 is provided at its top, and substantially midway along its length, with a lug 95 (FIGS. 2 and 6) to which one end of a corresponding helical tension spring 96 is connected. The opposite end of each helical tension spring 96 is connected to one end of a chain 97 and the opposite end of said chain 97 is, in turn, connected to an apertured lug 99 mounted at the top of an upright support beam 98 whose lower end is rigidly secured to one side of the corresponding frame beam 2 at a short distance in advance of the corresponding plate 7. The connection between each chain 97 and the corresponding apertured lug 99 is effected by way of a tension adjuster in the form of a screwthreaded rod 100 that is entered lenthwise through the hole in the lug 99 concerned, said rod 100 bearing a nut 101 at the side of the lug 99 remote from the respective chain 97 so that the nut 101 can be moved axially along the rod 100 to increase or decrease the degree of initial tension of the corresponding spring 96. The lugs 99 are mounted at the fronts of the respective support beams 98 with respect to the direction A. The rear of each support beam 98 with respect to the direction A is provided at a level just beneath that of the corresponding lug 99 with a fixedly mounted lug 102 that is inclined downwardly and outwardly towards the neighbouring carrier frame 49. The outwardly directed lower end of each lug 102 defines a corresponding substantially semicircular recess 103 that is shaped to receive the straight portion 44 of the frame beam 45 of the corresponding carrier frame 49 when that carrier frame 49 is tilted upwardly into an inoperative and/or transport position as is shown in broken outline in FIG. 2 of the drawings. A latch 105 is pivotally connected to each lug 102 and support beam 98 by a corresponding horizontal pivot pin 104 and it will be seen in FIG. 2 of the drawings that a portion of the lower edge of each latch 105 defines a substantially semicircular recess 106 which will co-operate with the recess 103 in the corresponding lug 102 in embracing the respective beam portion 44 under the circumstances that have just been mentioned. Each latch 105 has an inclined abutment edge 107 which is so disposed that, when it is contacted by the respective beam portion 44 during displacement of the corresponding carrier frame 49 into its upwardly tilted inoperative and/or transport position, the latch 105 concerned will be turned automatically upwards about its pivot pin 104 to enable the beam portion 44 to move into the nearly completely circular retaining recess that is formed by the combined recesses 103 and 106.

Each of the shafts 16 that are rotatably journalled in the three hollow frame portions 15 carries, inside that frame portion, a corresponding straight-toothed or spur-toothed pinion 108 (FIGS. 6, 7 and 8), the pinions 108 being of such a size and so arranged that the teeth of each of them are in mesh with those of the immediately neighbouring pinion, or both of the immediately neighbouring pinions, in the single row of such pinions that corresponds to the same frame portion 15. One of the center pair of shafts 16 in the single row of shafts in each of the two hollow frame portions 15 that is supported by a corresponding one of the two carrier frames 49 has an upward extension through the top of that frame portion 15 into a corresponding gear box 109 (FIGS. 1 and 7) that is fastened to the top of the frame portion 15 concerned. Each shaft extension is provided, inside the corresponding gear box 109, with a bevel pinion (not visible) whose teeth are in driven mesh with those of a further bevel pinion (not visible) that is carried by a shaft 110 which has an end that projects laterally from the gear box 109 concerned towards the main frame 1 at the center of the implement. The projecting end of each shaft 110 is splined or otherwise keyed and is connected by a sleeve 111 to one end of a corresponding transmission shaft 112 that is rotatably journalled, towards its opposite end, in a bearing carried by a housing 113 which is fastened to a support 114 (see FIG. 6) secured to the top of the hollow frame portion 15 concerned.

It can be seen in FIG. 1 of the drawings that the supports 114 are located quite close to the portions 44 of the two frame beams 45 of the two carrier frames 49 the ends of the rotary shafts 112 that are remote from the gear boxes 109 being connected by universal joints to telescopic transmission shafts 115 at points which are substantially in register with the portions 44 of the two frame beams 45. The ends of the telescopic transmission shafts 115 that are remote from the universal joints which have just been mentioned are connected by further universal joints to the ends of corresponding transmission shafts 116, the latter being rotatably supported in bearings carried by bearing housings 117 (FIG. 2) that are secured to upright supports 118 secured to the top of the central hollow frame portion 15 at locations which are close to the connections of the rear ends of the frame beams 2 to the limbs of the tie beam 4 (see FIG. 2). The ends of the two transmission shafts 116 that are remote from the respective telescopic shafts 115 are connected by splines or other keys that co-operate with sleeves 119 to the ends of two coaxial output shafts 120 of a central gear box 121 that is mounted on top of the central hollow frame portion 115 at a location closer to one lateral end thereof than it is to the other (see FIG. 1). One of the center pair of rotary shafts 16 that is carried by the central hollow frame portion 15 has an upward extension through the top of that hollow frame portion into the central gear box 121. The central gear box 121 has a forwardly projecting rotary input shaft 123, said shaft 123 extending substantially horizontally parallel to the direction A through the gear box 121 with its rearmost end entered into a change-speed gear 122 that is secured to the back of the central gear box 121 with respect to the direction A. A further substantially horizontal shaft that is parallel to the rotary input shaft 123 lies beneath that shaft in the gear box 121 in spaced relationship therewith and its rearmost end, also, projects through the back of the gear box 121 into the change-speed gear 122. This second shaft that is not visible in the drawings carries at least one bevel pinion and said pinion or pinions is/are in mesh with further bevel pinions carried by the two laterally projecting shafts 120 and the upward extension of one of the shafts 16 that corresponds to the central hollow frame portion 15 upon which the central gear box 121 is mounted. The ends of the rotary input shaft 123 and the underlying and relatively parallel shaft that has just been discussed which project into the change-speed gear 122 are splined or otherwise keyed for the reception of the matchingly splined or keyed hubs of pairs of straight-toothed or spur-toothed pinions of different sizes. The particular pair of toothed pinions that is chosen, and the arrangement thereof that is selected upon the shaft ends in the change-speed gear 122, dictates the transmission ratio between the input shaft 123 and the underlying and parallel shaft that cannot be seen in the drawings and thus the speed at which all of the soil working members 18 will be rotated in response to a more or less constant input speed of rotation applied to the leading end of the shaft 123.

The rotary input shaft 123 of the central gear box 121 projects forwardly from the front of the latter with respect to the direction A and is connected by way of a universal joint to the rearmost end of a telescopic transmission shaft 124 whose leading end, in turn, is connected by a further universal joint to the rotary output shaft of an auxiliary engine 125 that will usually be an internal combusion engine. The engine 125 is supported from beneath by the forwardly convergent beams 3 of the main frame beam 1 and by a transverse beam 126 that rigidly interconnects the beams 3 at locations which are short distances forwardly along the latter from their junctions with the leading ends of the beams 2. A tubular beam 127 of circular corss-section extends substantially horizontally perpendicular to the direction A at a location immediately beneath the two frame beams 2 and just to the rear of the frame beam 39 with respect to the direction A. The beam 127 is turnably received in downwardly directed semicircular recesses in two plates 128 that are welded to the relatively remote outer surfaces of the two frame beams 2, the downwardly directed semicircular recesses in the plates 128 being closed to retain the tubular beam 127 turnably therein by corresponding brackets 129 that are releasably secured to the respective plates 128 by bolts 130. The opposite ends of the tubular beams 127 that project laterally beyond the plates 128 and 129 have the ends of supporting arms 129A rigidly secured to them in such positions that said arms 129A are inclined downwardly and rearwardly with respect to the direction A away from the beam 127. An axle beam 130A that is substantially horizontally parallel to the tubular beam 127 rigidly interconnects the lowermost and rearmost ends of the supporting arms 129A, said axle beam 130A being of somewhat greater length than the tubular beam 127 and having pneumatically tyred ground wheels 131 rotatably mounted at its opposite ends at locations which are laterally just beyond the relatively remote sides of the two supporting arms 129A. It will be noted from FIG. 1 of the drawings that each carrier frame 49 is pivotally connected to the main frame 1 by one of the stub shafts 31 and one of the pivot pins 38, those parts defining a substantially horizontal axis that is substantially parallel to the direction A and being significantly spaced apart from one another in that direction. As seen in FIG. 1 of the drawings, one of the ground wheels 131 lies between the corresponding stub shaft 31 and pivot pin 38 in the direction A.

Each supporting arm 129A has a corresponding upwardly extending support plate 132 secured to it substantially midway along its length, each support plate 132 terminating at its upper end in a blunt tip. A hole is formed near the uppermost blunt-tipped end of each support plate 132 and one end of a corresponding helical tension spring 133 is hookingly engaged therewith. The opposite end of each helical tension spring 133 is connected to one end of a corresponding chain 134 whose opposite end is connected to a tension adjuster carried by an apertured lug 136 (FIG. 3) which is welded to the top of the support 8 that is carried by the corresponding frame beam 2. Each tension adjuster comprises a screwthreaded rod 135 having an eye at one end which is connected to the corresponding chain 134, the rod being entered through the hole in the corresponding lug 136 and being provided, at the side of that lug which is remote from the chain 134 concerned, with a nut 137. It will be evident from FIGS. 3 and 4 of the drawings that displacement of each nut 137 axially along the corresponding rod 135 will increase or decrease the degree of initial tension of the corresponding spring 133. At a distance beneath the connection thereof to the respective spring 133, each support plate 132 is coupled by a substantially horizontal pivot pin 138 to a fork 139 at the free end of the piston rod 140 of a corresponding single acting piston and cylinder assembly 141. Each assembly 141 has a cylinder 142 whose base end carries a pair of lugs 143 that are coupled by a horizontal pivot pin 144 to an ear 145 which projects rearwardly from a corresponding arm 146 substantially midway along the length of the latter. Each arm 146 is itself pivotally mounted, at its lower end, about a substantially horizontal pin 147 which interconnects an upright plate 148 and a lug 149 which are both secured to the respective frame beam 2 close to its junction with one of the frame beams 3. As can be seen in FIG. 4 of the drawings, each upright plate 148 is of basically right angled triangular configuration having a base edge secured to the frame beam 2 concerned and the edge that is perpendicular thereto extending substantially vertically upwards at the front of the plate with respect to the direction A. The oblique "hypotenuse" edge of each plate 148 lies alongside the corresponding arm 146 during pivotal displacement of that arm around the axis of the respective pin 147 so that the plate 148 serves as a guide for the arm. Each plate 148 is provided, near its uppermost corner, with a stop lug 149A that is arranged to define a limit to the turnability of the corresponding arm 146 about its pivot pin 147 in an anticlockwise direction as seen in FIG. 4 fo the drawings. The stop lugs 149A are, it will be noted, disposed at substantially the same horizontal level as are the pivot pins 144 which connect the arms 146 to the assemblies 141 by way of the lugs 143 and ears 145.

The upper end of each arm 146 is pivotally connected by a horizontal pin 150 to the leading end of a corresponding telescopic arm 151. Each arm 151 comprises a tubular portion 152 that is the portion of the arm which is directly connected by the respective pivot pin 150 to the corresponding arm 146, and a rod 153 that is slidable axially into, and out of, the end of the tubular portion 152 that is remote from the pivot pin 150 concerned. The free outer end of each rod 153 is secured to the base of a corresponding fork 154 and said fork has its limbs pivotally connected to the corresponding support plate 132 by a horizontal pin 155 which is disposed at a level between that of the connection of said plate 132 to the respective tension spring 133 and that of the corresponding pivot pin 138 which establishes the link between said plate 132 and the respective piston and cylinder assembly 141. It can be seen from FIG. 4 of the drawings that the longitudinal axis of each piston and cylinder assembly 141 and the longitudinal axis of the corresponding telescopic arm 151 are in parallel or substantially parallel relationship. The tubular portion 152 of each telescopic arm 151 has a latch 157 pivotally connected to it near the end thereof that is remote from the respective pivot pin 150 by horizontal trunnion pins 156. Each latch 157 comprises a pair of strips 158 that lie at opposite sides of the tubular portion 152 of the arm 151 concerned, said strips 158 converging towards one another throughout portions thereof that are spaced from the respective trunnion pins 156 and thus from the arm 151 concerned. The upper edges (as shown in FIG. 4 of the drawings) of the two strips 158 of each latch 157 are rigidly interconnected by two transverse pieces 159, the arrangement being such that the latch 157 which can be seen in FIG. 4 of the drawings can be turned downwardly about the axis defined by the trunnion pins 156 in a clockwise direction until, when the illustrated rod 153 is sufficiently extended from the corresponding tubular portion 152, said latch 157 can lie in substantially parallel relationship with the arm 151 with the gently convergent portions of its strips 158 at opposite sides of the extended rod 153, the two transverse pieces 159 bearing against the upper curved surface of the rod. The latch 157 thus prevents retraction of the rod 153 into the tubular portion 152 of the corresponding telescopic arm 151 so that the transport position of the implement which is illustrated in full lines in FIG. 4 of the drawings is maintained, the level of the axle beam 130A being well beneath that of the frame beams 2 in said transport position. The latches 157 thus guard against a sudden upward displacement of the ground wheels 131 relative to the main frame 1 in the event of loss of fluid pressure in the piston and cylinder assemblies 141.

The leading, with respect to the direction A, junction ends of the two frame beams 3 carry a substantially triangular coupling fork 160 formed with substantially vertically aligned holes through which a hitch pin or the like 161 can be entered to link the fork 160 to a tow bar, coupling lug or the like of a towing vehicle 162 that is shown only diagrammatically in FIG. 1 of the drawings and which could be an agricultural of other tractor or some other vehicle that is capable of moving the implement operatively in the direction A.

When the implement is to be used for a soil cultivating operation, its coupling fork 160 is connected to, for example, the tow bar of an agircultural tractor affording the towing vehicle 162 and the piston and cylinder assemblies of said implement are placed in connection with the hydraulic system of the vehicle 162 by way of quickly releasable leak proof couplings and flexible conduits that are not illustrated in the drawings but that may be of construction which is well known per se. The latches 157 are released and pressure is withdrawing from the assemblies 141 so that the ground wheels 131 turn bodily upwards about the axis of the tubular beam 127 as seen in FIG. 4 of the drawings until they occupy substantially the position that is shown in broken lines in FIG. 4 for one of them. The tined soil working members 18 thus move downwardly into operative contact with the ground. Adjustments that may, if required, be made before work commences include controlling the maximum depth to which the tines 20 of the soil working members 18 can penetrate into the soil and this adjustment is effected by setting the level of the axis of rotation of each ground roller 71 relative to the level of the corresponding hollow frame portion 15 by manual rotation of the corresponding pair of crank handles 68 in appropriate directions to cause the second sleeves 62 to project further from, or be retracted further into, the corresponding outer first sleeves 61 (FIG. 3). The speed of rotation of all of the members 18 about the axes of the respective shafts 16 can be increased, or decreased, as may be required in response to a more or less constant speed of rotation applied to the input shaft 123 of the central gear box 121 by an appropriate selection of pinions in the change-speed gear 122 as described above. These adjustments will usually be made having regard to the nature and condition of the soil that is to be cultivated and the particular purpose for which that soil is required when the cultivation has been completed.

As the machine moves operatively in the direction A, the main frame 1 is sustained from the ground surface by the two pneumatically tyred wheels 131 whereas the two laterally disposed carrier frames 49 are sustained partly by way of the corresponding springs 96 and chains 97 and partly by way of the two ground rollers 71 that are coupled to the frame portions 15 which correspond to the two carrier frames 49. The implement can match undulations in the surface of the soil over which it is travelling because the two carrier frames 49 can turn upwardly and downwardly relative to the main frame 1 about the axes that are defined by the corresponding pairs of stub shafts 31 and pivot pins 38, said axes being substantially horizontally parallel to the direction A. The three substantially coaxial rows of soil working members 18 are driven from the auxiliary engine 125 through the transmission that has been described above and each member 18 will revolve in the opposite direction to the or each of its neighbours in the tow as shown by curved arrows in FIG. 8 of the drawings. It will be noted from FIG. 8 that the transmission is arranged so that the two members 18 which are at the opposite sides of the gaps between the ends of the frame portions 15 also revolve in opposite directions during the operation of the implement. The two tines 20 of each member 18 are spaced apart from one another by a distance which is a little greater than the spacing (preferably substantially 25 centimeters) between the axes of rotation of immediately neighbouring shafts 16 in each hollow frame portion 15 so that the strips of soil that are worked by the individual members 18 overlap one another to produce a single broad strip of cultivated land throughout the working width of the implement, there being very little, if any, discontinuity at the locations which register, in the direction A, with the very narrow gaps between the three groups of soil working members 18 that correspond to the three frame portions 15. The broad strip of soil that is worked by the implement that has been described will, with the preferred dimensions that have been discussed above, have a width of substantially 9 meters.

Figure 8:
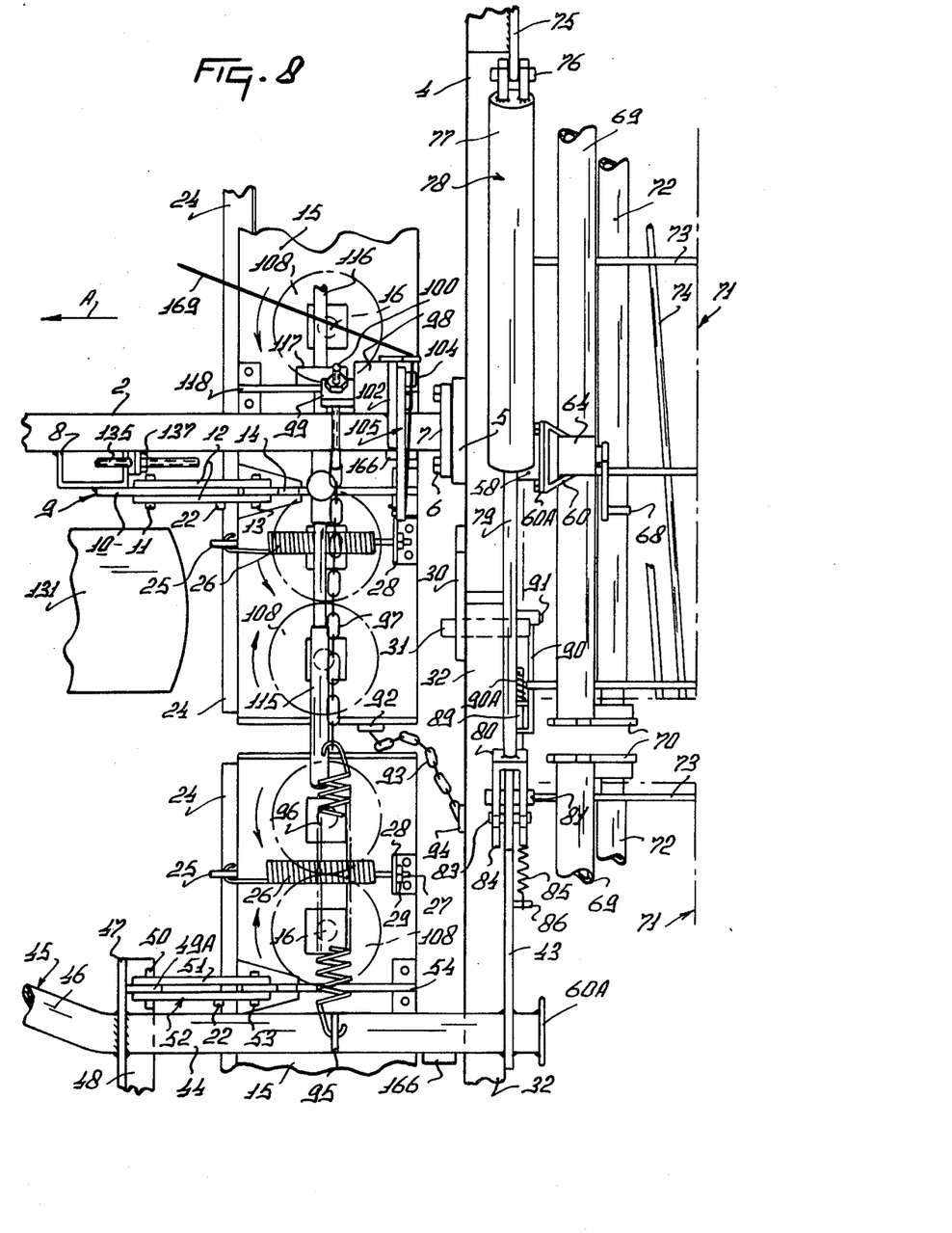
FIG. 8 is a plan view as seen in the direction indicated by an arrow VIII in FIG. 2.

Each of the three frame portions 15, together with the soil working members 18 which it carries, can move upwardly and downwardly relative to the main frame 1 or to the corresponding one of the two frames 49, independently of the other frame portions 15 because of the connections of said frame portions 15 to the frames 1 and 49 by way of the dual parallelogram linkages 12A and 52. Thus any one of the three groups of soil working members 18 can deflect to avoid an obstacle independently of the other two groups, the drive transmission to the three groups comprising telescopic shafts and universal joints that are arranged to accommodate such deflections without any interruption in drive. Significant deflections of the frame portions 15 and their soil working members 18 in directions that extend laterally of the direction A are prevented by the upper portions 10 of the plates 9 which co-operate with the upper pairs of arms 12 of the dual parallelogram linkage 12A and by the pairs of strips 55 that co-operate with the upright supports 54 of the dual parallelogram linkages 52. As previously mentioned, part of the weight of each carrier frame 49 and the members which are connected thereto is sustained from the main frame 1 by way of the corresponding spring 96 and chain 97. The implement can sometimes be connected to a rear mounted lifting device or hitch of a towing vehicle 162 and, in order to avoid overloading such lifting device or hitch, weights 163 (FIG. 1) may be arranged at the front of the auxiliary engine 125 with respect to the direction A so as substantially to counterbalance the weight of those parts of the implement that are located rearwardly of the axle beam 130A with respect to the direction A. The resilient suspension of the working parts of the implement is further improved by the provision of the tension springs 133 which, as will be evident from FIGS. 3 and 4 of the drawings, resiliently oppose upward bodily displacements of the ground wheels 131 about the longitudinal axis of the tubular beam 127. The effect of the springs 133 can be increased or decreased, as may be required, by manipulation of the tension adjusters which comprise the parts 135 and 137 (FIGS. 3 and 8).

The large working width of the implement makes it necessary that it should be brought to its transport position for almost all inoperative transport purposes and, usually, for storage. To attain this position from the operative position of the implement, the cylinders 142 of the two piston and cylinder assemblies 141 are subject to the pressure of oil or other hydraulic pressure medium from the hydraulic system of the agricultural tractor ot other towing vehicle 162 by way of ducts 164 (FIG. 4) and this causes the ground wheels 131 to be turned bodily downwards in a clockwise direction as seen in FIG. 4 of the drawings about the axis of the tubular beam 127 to bring them to the position that is shown in full lines in that Figure, the main frame 1 of the implement thus being pushed upwardly away from the ground sruface. Chains 165 (FIGS. 3 and 6) interconnect lugs 166 carried by the frame beams 2 and the portions 44 of the frame beams 45 and the upright supports 114 and 118 that are mounted on top of the hollow frame portions 15. These chains 165 co-operate with the pairs of strips 55 (FIG. 7) in ensuring that the arms 12 and 51 of the dual parallelogram linkages 12A and 52 cannot turn too far downwardly so that, when the ground wheels 131 are bodily displaced relative to the main frame beam 1 as has just been described, the tined soil working members 18 that correspond to all three hollow frame portions 15 are raised well clear of contact with the ground surface as is shown in FIGS. 3, 6 and 7 of the drawings. The chains 165 perform their function by becoming taut whereas the guide strips 55 perform their function by block-downward movements of the upper pairs of linkage arms 51 beyond the angular positions thereof that are shown in FIG. 7 of the drawings. When the soil working members 18 are raised clear of contact with the ground as has just been discussed, the lowermost free ends or tips of their tines 20 are spaced from the ground surface by distances of substantially 12.5 centimeters. The next step is to subject the pistons of the two double-acting piston and cylinder assemblies 78 to hydraulic pressure by way of ducts 167 in such a way that the rods 79 of the assemblies 78 are withdrawn into their cylinders 77. The carrier frames 49 and the parts which are connected thereto are thus tilted upwardly and inwardly about the axes defined by the stub shafts 31 and pivot pins 38 to bring them to the symmetrically similar positions that are illustrated in broken lines for one of them in FIG. 2 of the drawings. During the upward pivotal displacement of the two carrier frames 49, the chains 93 (FIGS. 2 and 8) become taut and thus cause the hollow frame portion 15 that corresponds to the central main frame 1 to be lifted further upwardly away from the ground surface. Thus, eventually, the free ends or tips of the tines 20 of the members 18 that correspond to the central hollow frame portion 15 are spaced from the ground surface by distances of substantially 35 centimeters. The upward pivotal displacement of the two carrier frames 49 also causes the two stop levers 84 to be turned about their pivots 83 in directions corresponding to the direction B that is shown for one of them in FIG. 2 of the drawings because of the provision of the rods 89. When upward tilting of the carrier frame 49 that is partly illustrated in FIG. 2 of the drawings has been accomplished, the corresponding lever 84 will have reached substantially the position thereof that is shown in FIG. 5. The gently curved end of the illustrated lever 84 then bears against one limb of the corresponding fork 80 thus blocking reciprocation of the pivot pin 81 concerned along the slot 82 during transport. The blocking position of the lever 84 that is illustrated in FIG. 5 of the drawings about its pivot 83 is maintained because the tension spring 85 urges one side of the lever 84 into engagement with a small stop 168 that is carried by the corresponding upright plate 43. It will be appreciated that the slots 82 are provided to enable the carrier frames 49 to tilt upwardly and downwardly about the axes defined by the stub shafts 31 and the pivot pins 38 when the implement is in operation without usually being restricted in any way by the piston and cylinder assemblies 78. Just before the carrier frames 49 arrive at their final upwardly tilted positions, the portions 44 of the respective frame beams 45 come into contact with the abutment edges 107 of the two latches 105. Gravity normally causes the lower edges of the latches 105 to bear downwardly against stops 170 that are provided on the fixed lugs 102 but, when the beam portions 44 come into contact with the edges 107, the latches 105 are lifted about the pivot pins 104 until said beam portions move into the semicircular recesses 103 whereafter the latches 105 fall back downwardly about their pivot pins 104 to bring their own semicircular recesses 106 into embracing relationship with said beam portions. Cables 169 have their ends connected to eyes in the latches 105 and are passed through guides carried at the tops of the supporting beams 98 and, if required, further guides that are not illustrated, the opposite leading ends of the cables 169 being located adjacent to the driver of the agricultural tractor or other towing vehicle 162 where he can pull said cables to turn the latches 105 upwardly about their pivot pins 104. This is necessary to release the beam portions 44 when the carrier frames 49 are to be tilted outwardly and downwardly to bring the implement from its inoperative and/or transport position to its working position.

When the implement is in its inoperative and/or transport position, the arms 146 (FIG. 4) bear against the stop lugs 149A on the upright plates 148, pressure meanwhile being maintained in the cylinders 142 of the assemblies 141. The latches 157 can then be turned downwardly about the trunnion pins 156 in a clockwise direction as seen in FIG. 4 of the drawings to bring them to their operative positions in which the rods 153 cannot be withdrawn into the tubular portions 152 of the telescopic arms 151. Pressure can then be withdrawn from the ducts 164 without the main frame 1 moving downwardly towards the ground surface since the ground wheels 131 are maintained against upward bodily displacement about the longitudinal axis of the tubular beam 127. It is noted that, when not in use, the latches 157 are displaced about the trunnion pins 156 in an anticlockwise direction as seen in FIG. 4 of the drawings until they lie substantially on top of the tubular portions 152 with at least one of the transverse pieces 159 in contact therewith. The position of the latch 157 that is shown in FIG. 4 of the drawings is adopted purely for descriptive purposes. When the implement is to be stored with its coupling fork 160 disconnected from the towing vehicle 162, an upwardly and downwardly displaceable supporting foot 171 (FIG. 1) is lowered into contact with the ground to maintain the implement in a stable upright position. The supporting foot is coupled to one side of one of the frame beams 3 and may have a construction and mounting that is known per se. If the implement is to be used with a heavy tractor whose rear power take-off shaft has a high power output rating, the auxiliary engine 125 may be replaced by a counterweight holder and drive may be transmitted to the central gear box 121 of the implement directly from the power take-off shaft of said tractor by way of a long telescopic transmission shaft, equivalent to the shaft 124, having universal joints at its opposite ends or by way of two such shafts interconnected by a further shaft (not shown) that is rotatably mounted in a bearing assembly positioned towards the front of the implement.

The implement that has been described has a large working width which, as discussed above, can be as great as substantially 9 meters but, despite this large working width, the two carrier frames 49 and the three groups of soil working members 18 can move upwardly and downwardly to match undulations in the ground surface and to enable obstacles in the soil to be avoided without breakage or significant damage. The provision of the ground wheels 131 between, in the direction A, the stub shafts 31 and pivot pins 38 that define the axes about which the carrier frames 49 are upwardly and downwardly tiltable relative to the main frame 1 enables the implement to be brought from its working position to a position suitable for this inoperative transport thereof both quickly and easily without, usually, it being necessary for the driver of the tractor or other towing vehicle 162 to leave his driving seat. The width of the path of travel of the implement when the latter is in its transport position is such that the implement can readily be moved from, for example, one field to another without any difficulties being encountered at gateways and the like. The implement can equally quickly be returned from its inoperative transport position to its working position.

Although various features of the soil working implement or machine that have been described and/or that are illustrated in the accompanying drawings will be set forth in the following claims as inventive features, it is empahasised that the invention is not necessarily limited to those features and that it inlcudes within its scope each of the part of the soil working implement or machine that has been described, and/or that is illustrated in the accompanying drawings, both individually and in various combinations.

What we claim is:

1. A soil cultivating implement comprising frame means including a main frame and carrier frames pivoted at the lateral sides of the main frame, said main frame and carrier frames each supporting respective groups of soil working members and driving means connected to rotate said members, said groups being positioned adjacent one another side-by-side during operation, means pivoting said carrier frames and respective groups of members to upwardly tilted positions, a central group of working members corresponding to said main frame being interconnected to said carrier frames by connecting means and said central group being raised in horizontal level relative to the main frame by said connecting means when said carrier frames are tilted upwardly, a spring mechanism interconnecting each carrier frame to said main frame, said mechanism and main frame sustaining part of the weight of the carrier frame and the respective group of members during operation, said spring mechanism being connected to said carrier frame and a respective support mounted on said main frame, said support having a latch to retain the carrier frame in its upwardly tilted position, said latch cooperating with a beam of the carrier frame and said latch being automatically engaged upon said beam being tilted upwardly into engagement therewith, said latch having a release mechanism that is operable to disengage from the latch when the tilted carrier frame is lowered into a working position.

2. An implement as claimed in claim 1, wherein said carrier frames are in substantial alignment with one another and with the main frame in working position, each carrier frame being pivotally connected to said main frame, each connecting member being located between a respective carrier frame and the central group.

3. An implement as claimed in claim 2, wherein said main frame and carrier frames each have respective portions that support their groups of soil working members and said portions are upwardly and downwardly displaceable relative to the remainders of those frames with corresponding parallelogram linkages.

4. An implement as claimed in claim 3, wherein each parallelogram linkage includes an upright guide positioned to guide the movements of said linkage and prevent same from deflecting laterally in a direction transverse to the direction of travel, said linkage comprising a stop that restricts the downward pivotability of that linkage.

5. A soil cultivating implement comprising frame means, including a main frame and carrier frames pivoted at the lateral sides of the main frame, said main frame and carrier frames each supporting respective groups of soil working members and driving means connected to rotate said members, said groups being positioned adjacent one another side-by-side during operation, means pivoting said carrier frames and respective groups of members to upwardly tilted positions, a central group of working members corresponding to said main frame being interconnected to at least one carrier frame by connecting means, each carrier frame and said central group being raised in level relative to the main frame when said one carrier frame is tilted to inoperative position, each carrier frame being pivoted to one end of a fluid pressure operated piston and cylinder assembly, the opposite end of said assembly being connected to said main frame, and the pivotal connection of the assembly to the carrier frame being displaceable relative thereto, said displaceable pivotal connection comprising a slot along which a pivot pin is displaceable and said pin defining the pivotal axis of the connection, a stop lever maintaining said pin in a substantially fixed position along said slot when the carrier frame occupies its upwardly tilted position.

6. An implement as claimed in claim 5, wherein each of said carrier frames is connected to a rotatable supporting member that extends across the working width of the respective group of soil working members, adjusting means interconnecting said rotatable supporting member to said frame portion to maintain the respective group in a chosen position relative to the level of the corresponding carrier frame.

7. An implement as claimed in claim 5, wherein each carrier frame is interconnected to said central group by connecting members and said central group being raised in level relative to the main frame when the carrier frames are tilted to inoperative positions.

8. An implement as claimed in claim 5, wherein the stop lever is urged by a spring to pivot about an axis that extends substantially parallel to direction of travel, said axis also being substantially parallel to the axis about which the carrier frame is pivotable relative to said main frame, an actuating rod extending between an end of the stop lever and the main frame, said lever and the carrier frame being interconnected by a spring device.

* * * * *